United States Patent [19]
Korovesis et al.

[11] Patent Number: 5,394,162
[45] Date of Patent: Feb. 28, 1995

[54] LOW-LOSS RF COUPLER FOR TESTING A CELLULAR TELEPHONE

[75] Inventors: Danny N. Korovesis, Dearborn Heights; James D. Brake, Canton; Andrew Adrian, Ypsilanti, all of Mich.

[73] Assignee: Ford Motor Company, Dearborn, Mich.

[21] Appl. No.: 33,727

[22] Filed: Mar. 18, 1993

[51] Int. Cl.⁶ ............................................. H01Q 1/00
[52] U.S. Cl. ................................... 343/703; 343/906
[58] Field of Search ............... 343/703, 715, 841, 906;
H01Q 1/32, 1/42, 1/50

[56] References Cited

U.S. PATENT DOCUMENTS

| | | | |
|---|---|---|---|
| 3,286,264 | 11/1966 | Miley | 343/703 |
| 4,134,119 | 1/1979 | Sandoz et al. | 343/703 |
| 4,193,076 | 3/1980 | Ito et al. | 343/702 |
| 4,220,955 | 9/1980 | Frye | 343/703 |
| 4,261,630 | 4/1981 | Knappenberger | 439/135 |
| 4,740,794 | 4/1988 | Phillips et al. | 343/702 |
| 4,794,396 | 12/1988 | Pothier | 343/703 |
| 5,014,346 | 5/1991 | Phillips et al. | 455/89 |
| 5,016,020 | 5/1991 | Simpson | 343/703 |
| 5,278,571 | 1/1994 | Helfrick | 343/703 |

Primary Examiner—Michael C. Wimer
Attorney, Agent, or Firm—Kevin G. Mierzwa; Roger L. May

[57] ABSTRACT

A low-loss RF coupler for testing a cellular telephone through the antenna mount has a base with a hole large enough to fit over said antenna mount and a ground plane extending over a surface of the base. The hole has a contact portion which is electrically isolated from the ground plane by an airgap. A pair of transmission lines is provided, one having a signal portion electrically connected from the contact portion to the test equipment and the other having a ground portion electrically connected from the ground plane to the test equipment.

6 Claims, 2 Drawing Sheets

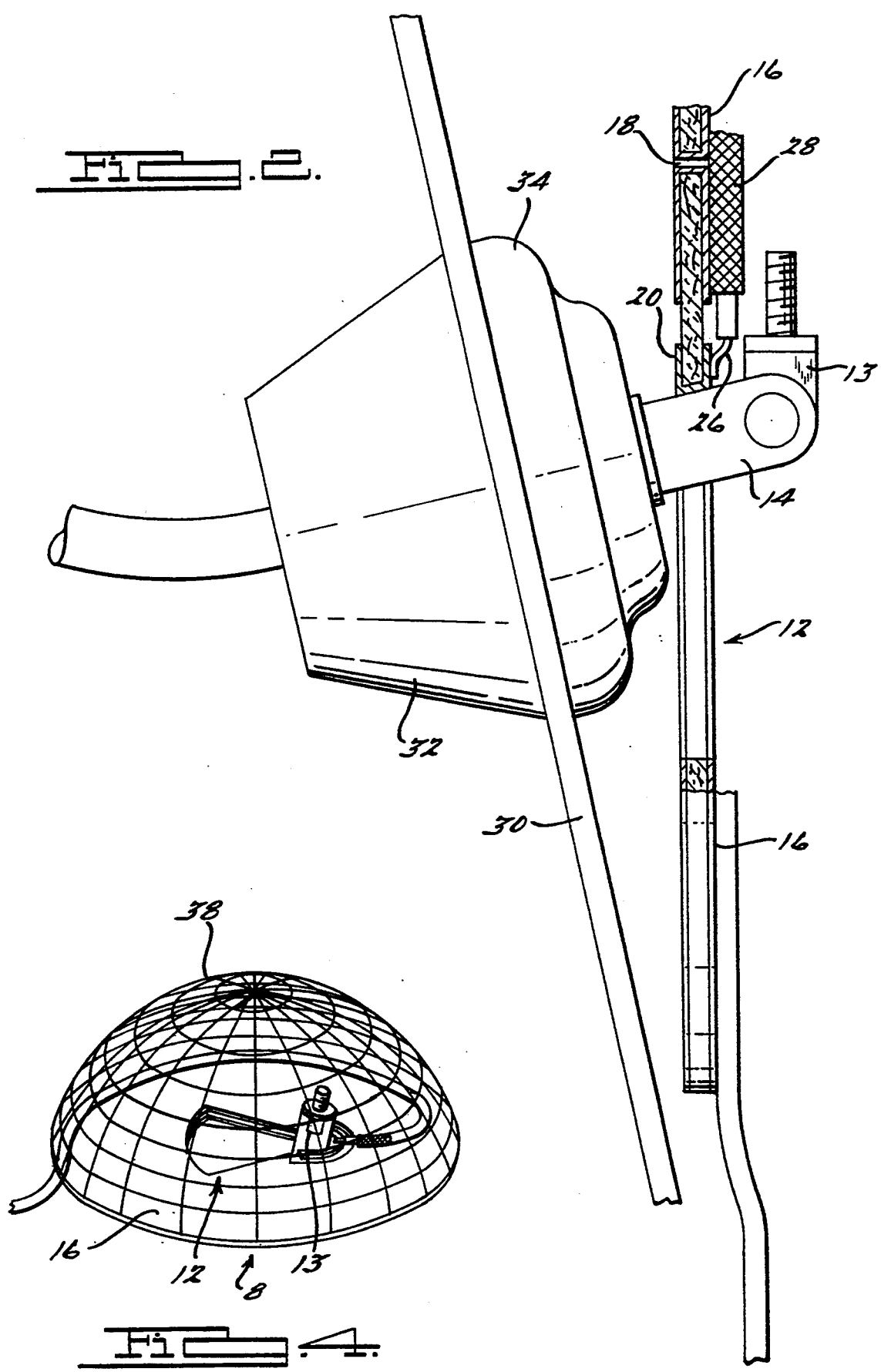

LOW-LOSS RF COUPLER FOR TESTING A CELLULAR TELEPHONE

BACKGROUND OF THE INVENTION

The invention relates generally to a coupling device and more particularly to a coupling device for linking a cellular telephone antenna mount on an automobile with equipment for testing the operation of cellular telephones.

Because automobile manufacturers are now installing cellular telephones into vehicles on the assembly line, a need exists to quickly and accurately test the integrity of the installed telephone. Antenna whips for the phones are typically mounted to an antenna coupling element located on the outside of the rear window. However, it would be desirable to defer installation of the antenna whips until after the vehicles are transported to the point of sale. Therefore, telephone testing is preferably performed without antennas. Test equipment has been developed to test the integrity of the cellular telephone by directly coupling to the antenna coupling element. Methods used to connect to the antenna coupling element include alligator clips or screw-on connectors. However, these methods of connecting test equipment have proven to give nonrepeatable results because they are susceptible to interference from machinery in the plant, the position of the connecting wire, and sensitivity to nearby human bodies. Furthermore, using a screw-on connector also has the problem of being time consuming to install.

It would be desirable to have a method of quickly connecting test equipment to obtain repeatable and accurate test results.

SUMMARY OF THE INVENTION

It is therefore an object of the invention to provide a coupling device to be used in the testing of cellular telephones which exhibits low loss and provides repeatable results.

It is also an object of the invention to provide a coupling device which is easily placed on the antenna coupling element and to provide a good contact between the antenna coupling element and the coupler.

Briefly, a preferred embodiment of the present invention includes a planar base having a hole large enough to fit over the antenna coupling element and a ground plane extending over a surface of the base. A contact extending within a portion of the hole is electrically isolated from the ground plane by an airgap. A pair of transmission lines connects the coupler to test equipment, one having a signal portion electrically connected from the contact portion and the other having a ground portion electrically connected to the ground plane.

The coupler provides the advantages of easy use and high durability because there are no moving parts.

DETAILED DESCRIPTION OF THE INVENTION

FIG. 2 shows a side view of a preferred embodiment of the present invention coupled to an antenna coupling element.

FIG. 4 shows the invention with an enclosure for reducing noise pickup during the test procedure.

DETAILED DESCRIPTION OF THE INVENTION

Figure 1:
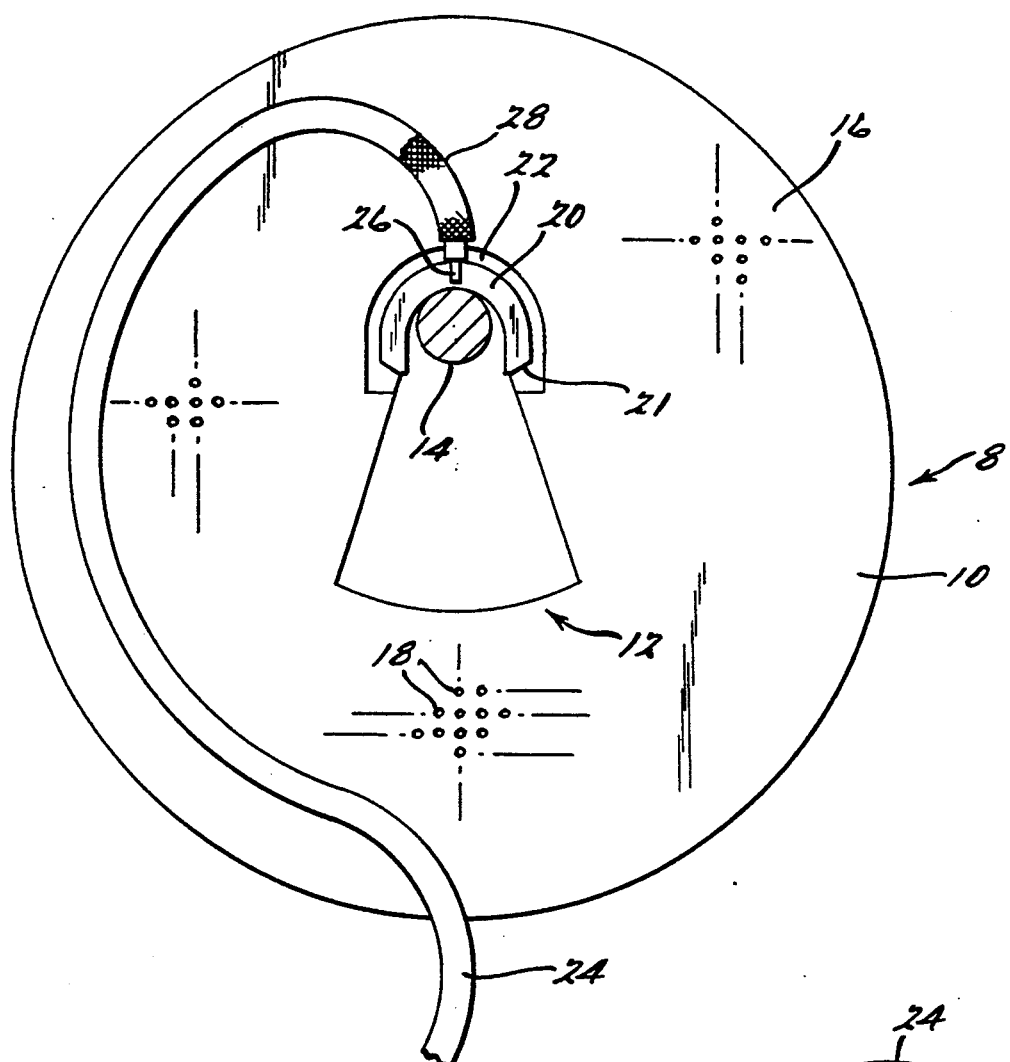
FIG. 1 shows a front view of a preferred embodiment of the present invention.

Referring now to FIGS. 1 and 2, the low-loss coupler 8 has a rigid base 10 comprised of a printed circuit board or other rigid lightweight material in the form of a circular disk. Base 10 has a ground plane 16 supported upon on its planar surfaces which is preferably comprised of a conductive material such as tin-coated copper. Ground plane 16 can alternatively extend to both planar surfaces of base 10. The two conductive ground plane surfaces are electrically connected through base 10 by one or more vias 18.

Base 10 has a hole 12 located near its center. Hole 12 may have any desired shape and is generally sized to allow a conductive antenna stud 14 and a conductive antenna mount 13 to be easily placed through it. However, a keyhole shape with a narrower top portion widening at the bottom portion was found to ease installation and alignment of the coupler. A semicircular contact 20 lines the interior surface of the narrow portion of hole 12 and covers an adjacent strip of the planar surfaces of base 10. Contact 20 is electrically isolated from ground plane 16 by a small airgap 22. To prevent internal reflection of signals within contact 20, the ends of contact 20 on the planar surfaces are tapered (for example, 45 degrees) as shown at 21.

Coupler 8 is connected to cellular telephone test equipment through a two-wire transmission line comprised of a coaxial cable 24. Cable 24 has an inner conductor 26 electrically connected to contact 20 and an outer conductor 28 electrically connected to ground plane 16. The insulated portion of cable 24 is fastened with an adhesive (not shown) to ground plane 16 with its free end exiting ground plane 16 at a point directly below contact 20. Thus, coupler 8 can hang on antenna stud 14 such that the weight of cable 24 holds contact 20 in firm electrical contact with antenna stud 14 during testing.

During manufacture, a cellular phone (not shown) located in a vehicle (not shown) is connected to an inside antenna coupling element 32 mounted on the inside of window glass 30. Antenna coupling element 32 is inductively coupled to an outside antenna coupling element 34 mounted on the outside of glass 30. Outside antenna coupling element 34 has an antenna stud 14 with a threaded antenna mount 13 for attaching the antenna whip (not shown) after the vehicle is delivered. To test the integrity of the cellular telephone in the vehicle without having to attach the antenna whip, hole 12 in coupler 8 is first placed over antenna mount 13. Coupler 8 is allowed to rest on antenna stud 14 so that contact 20 remains in electrical contact with stud 14 during testing. The test equipment then exchanges test signals with the cellular telephone through cable 24 and coupler 8 and then to the cellular telephone in a predetermined test procedure simulating transmission and reception of the cellular phone.

A loss of only 3 db was measured using a disk-shaped base with a three inch diameter. A larger size may be used, however the performance was not significantly increased.

Figure 3:
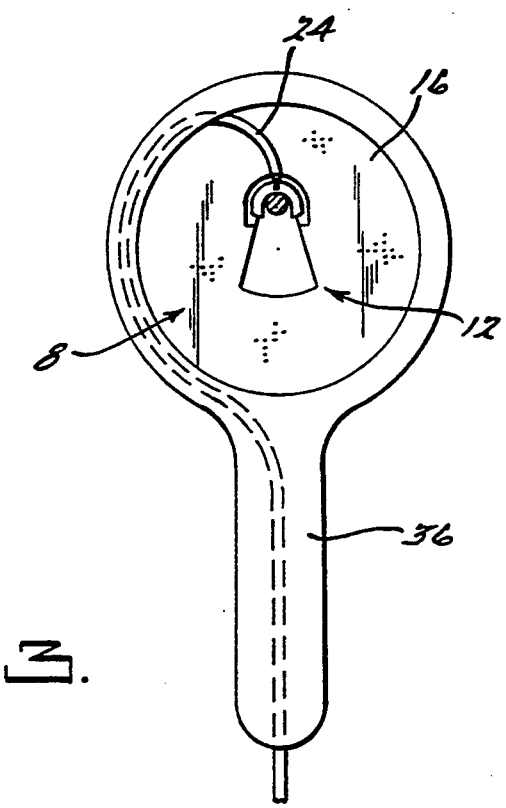
FIG. 3 shows the invention with a strain relief handle.

Referring now to FIG. 3, a handle 36 is provided which secures to the perimeter of coupler 8 with an interference fit. Handle 36 provides a convenient place to grip the coupler 8 as well as strain relief for cable 24.

Handle 36 is molded from a nonconducting material such as Lucite to prevent interference with the performance of coupler 8. The Lucite handle also prevents damage to the finish of cars on the assembly line should the coupler be dropped.

Referring now to FIG. 4, a conductive shield 38 comprised of a wire mesh supports itself over one planar surface of ground plane 16 in a dome-like manner to reduce electromagnetic interference received by the system. Shield 38 is soldered to make an electrical connection to the perimeter of ground plane 16. When coupler 8 is placed over antenna mount 13, shield 38 extends over ground plane 16 and antenna mount 13. Shield 38 is particularly useful when the testing location is near a cellular telephone cell site or noisy machinery.

What is claimed is:

1. A low-loss RF coupling device for coupling testing equipment to a conductive antenna mount comprising:
    a base having a first planar surface and a beyond planar surface, said base having a hole extending through both said first planar surface and said second planar surface, said hole having an interior surface for receiving said conductive antenna mount, and said hole having an elongated shape with a top portion and a bottom portion, said top portion having a width less than said bottom portion;
    a first conductive ground plane extending over said first planar surface;
    a contact disposed within said top portion and on said interior surface for electrically connecting to said conductive antenna mount, said contact being electrically isolated from said ground plane; and
    a pair of transmission lines, one transmission line being electrically connected from said contact to said test equipment and the other transmission line electrically connected from said first ground plane to said test equipment.

2. A coupling device as in claim 1 further comprising a second ground plane disposed on said second surface and electrically connected to said first ground plane.

3. A coupling device as in claim 1 further comprising a nonconductive handle attached to said base.

4. A coupling device as in claim 1 wherein said base is disk shaped.

5. A coupling device as in claim 3 wherein said base has a diameter of about 3 inches or more.

6. A coupling device as in claim 1 wherein said transmission lines comprise a coaxial cable.

* * * * *